US012754741B2

(12) United States Patent
Jain et al.

(10) Patent No.: US 12,754,741 B2
(45) Date of Patent: Oct. 6, 2026

(54) MANAGING MOTHERBOARD REPLACEMENT AT AN INFORMATION HANDLING SYSTEM

(71) Applicant: Dell Products L.P., Round Rock, TX (US)

(72) Inventors: Shailesh Hastimal Jain, Mahrashtra (IN); Gokul Thiruchengode Vajravel, Bangalore (IN); Ramanaa H V, Bangalore (IN); Jyothi Bandakka Nanjappa, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 309 days.

(21) Appl. No.: 18/664,429

(22) Filed: May 15, 2024

(65) Prior Publication Data

US 2025/0355671 A1 Nov. 20, 2025

(51) Int. Cl.

| | |
|---|---|
| ***G06F 9/44*** | (2018.01) |
| ***G06F 9/4401*** | (2018.01) |
| ***G06F 21/57*** | (2013.01) |
| ***G06F 21/60*** | (2013.01) |
| *G06F 21/44* | (2013.01) |
| *G06F 21/78* | (2013.01) |

(52) U.S. Cl.

CPC .......... *G06F 9/4401* (2013.01); *G06F 21/575* (2013.01); *G06F 21/602* (2013.01); *G06F 21/44* (2013.01); *G06F 21/78* (2013.01)

(58) Field of Classification Search

CPC .... G06F 9/4401; G06F 21/575; G06F 21/602; G06F 21/78; G06F 21/44

See application file for complete search history.

(56) References Cited

U.S. PATENT DOCUMENTS 12,367,499 B2 * 7/2025 Pratt ........................ B60L 53/65
2025/0045420 A1 * 2/2025 Rao ......................... G06F 21/44

OTHER PUBLICATIONS

Windows Autopilot motherboard replacement scenario guidance (https://learn.microsoft.com/en-us/autopilot/autopilot-motherboard-replacement, Jun. 19, 2024); 20 pages.

* cited by examiner

*Primary Examiner* — Ernest Unelus

(74) *Attorney, Agent, or Firm* — McDermott Will & Schulte LLP

(57) ABSTRACT

Managing motherboard replacement, including determining a first identifier of a first motherboard and a second identifier of computing component; registering the client IHS to a management server IHS with the first identifier and the second identifier; obtaining, based on the first and the second identifiers, a particular management license for the client IHS; providing the particular management license to be associated with the first motherboard; activating the particular management license for the first motherboard; detecting replacement of the first motherboard with a second motherboard at the client IHS, and in response: determining a third identifier of the second motherboard of the client IHS; re-registering the client IHS to the management server IHS with the third and the second identifiers; identifying the particular management license based on the second identifier; providing the particular management license to be associated with the second motherboard; activating the particular management license for the second motherboard.

15 Claims, 7 Drawing Sheets

MANAGING MOTHERBOARD REPLACEMENT AT AN INFORMATION HANDLING SYSTEM

BACKGROUND

Field of the Disclosure

The disclosure relates generally to managing motherboard replacement at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A motherboard is the central component that connects and facilitates communication between various hardware components in an information handling system. It can include the CPU, RAM, graphics card, storage drives, and other essential components. Motherboard replacement can arise due to various reasons, such as hardware failure, compatibility issues, or the need to upgrade to a more powerful board. Common scenarios include damaged components, outdated technology, or the desire to enhance system performance.

SUMMARY

Innovative aspects of the subject matter described in this specification may be embodied in a method of managing motherboard replacement at a client information handling system (IHS), including: determining, by the client IHS, a first identifier of a first motherboard of the client IHS and a second identifier of another computing component of the client IHS; registering the client IHS to a management server information handling system (IHS) with the first identifier and the second identifier; obtaining, by the management server IHS and based on the first identifier and the second identifier, a particular management license for the client IHS; providing, by the management server IHS and to the client IHS, the particular management license to be associated with the first motherboard; activating, by the client IHS and at a first time, the particular management license for the first motherboard; detecting, at a second time after the first time, replacement of the first motherboard with a second motherboard at the client IHS, and in response: determining, by the client IHS, a third identifier of the second motherboard of the client IHS; re-registering the client IHS to the management server IHS with the third identifier and the second identifier; identifying, by the management server IHS, the particular management license based on the second identifier; providing, by the management server IHS and to the client IHS, the particular management license to be associated with the second motherboard; and activating, by the client IHS, the particular management license for the second motherboard.

Other embodiments of these aspects include corresponding systems, apparatus, and computer programs, configured to perform the actions of the methods, encoded on computer storage devices.

These and other embodiments may each optionally include one or more of the following features. For instance, the another computing component includes a display device coupled to the information handling system. The another computing component includes a keyboard device coupled to the information handling system. Obtaining the particular license management license for the client IHS further includes: requesting, by the server IHS and to a database, the particular license management license based on the first identifier and the second identifier; and receiving, by the server IHS and from the database, the particular license management license. Updating, by the management server IHS, the database to associate the particular management license with the third identifier of the second motherboard; and maintaining the association of the particular management license with the second identifier of the additional computing component. Requesting, by the client IHS and to the management server IHS, application licenses for the client IHS; identifying, by the management server IHS, the application licenses based on the third identifier and the second identifier; providing, by the management server IHS and to the client IHS, the application licenses; and activating, by the client IHS, the application licenses.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
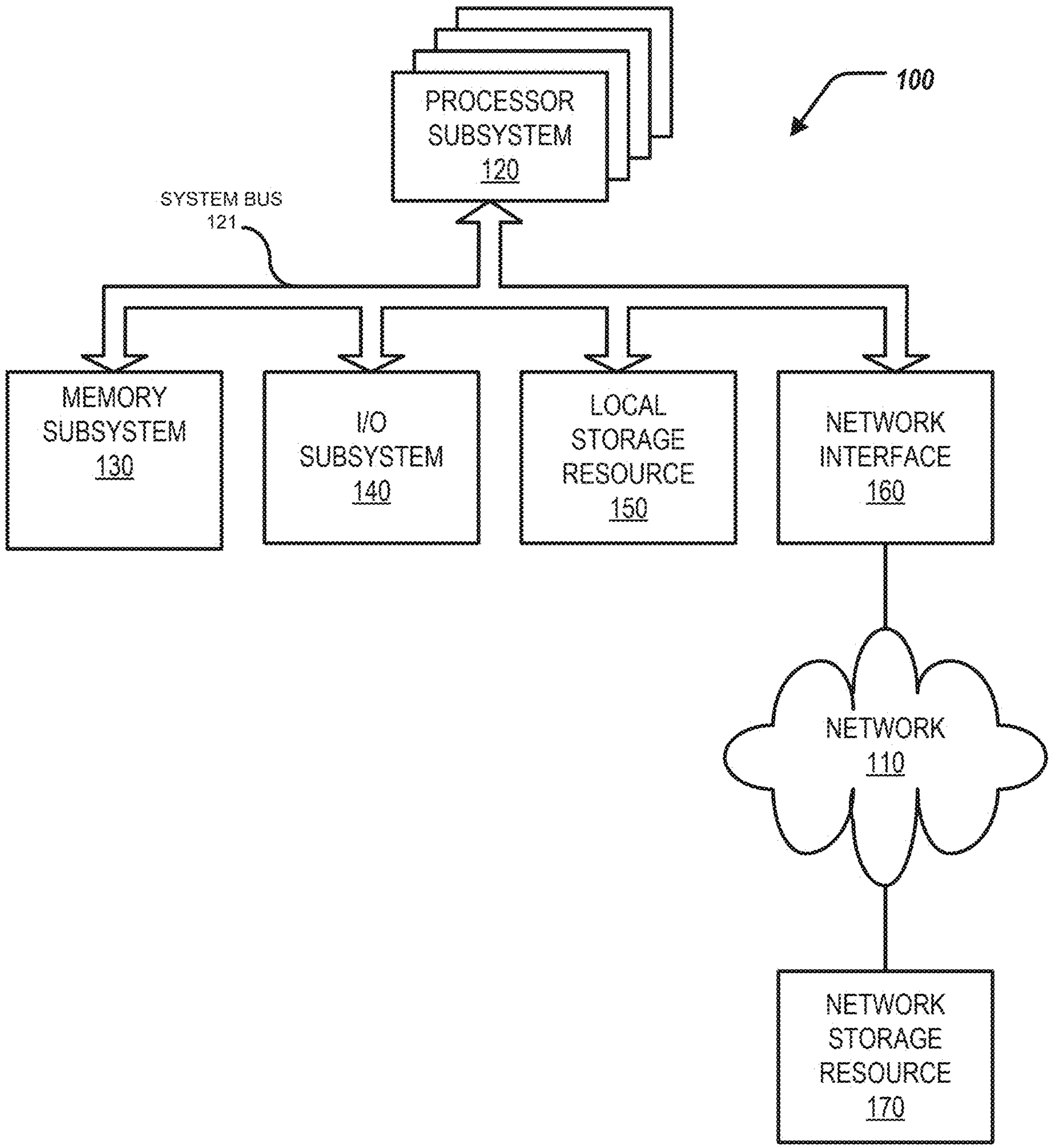
FIG. 1 is a block diagram of selected elements of an embodiment of an information handling system.

This disclosure discusses methods and systems for managing motherboard replacement at an information handling system. In short, a first motherboard can fail (have a fault) and needs to be physically replaced. Zero-touch manageability experience for replacement of the motherboard can be provided. Specifically, a combination of identifiers of the motherboard and/or computing components can be utilized to identify management licenses for a replacement motherboard. That is, migration of the management license can be transferred to the new motherboard without the need of an IT administrator and/or field/service engineers. The motherboard can be replaced while skipping OOBE steps for the end-user. In short, the motherboard can be replaced and the management license applied to the new motherboard based on identifiers of the computing components.

Specifically, this disclosure discusses a system and a method for management motherboard replacement at a client information handling system (IHS), including determining, by the client IHS, a first identifier of a first motherboard of the client IHS and a second identifier of another computing component of the client IHS; registering the client IHS to a management server information handling system (IHS) with the first identifier and the second identifier; obtaining, by the management server IHS and based on the first identifier and the second identifier, a particular management license for the client IHS; providing, by the management server IHS and to the client IHS, the particular management license to be associated with the first motherboard; activating, by the client IHS and at a first time, the particular management license for the first motherboard; detecting, at a second time after the first time, replacement of the first motherboard with a second motherboard at the client IHS, and in response: determining, by the client IHS, a third identifier of the second motherboard of the client IHS; re-registering the client IHS to the management server IHS with the third identifier and the second identifier; identifying, by the management server IHS, the particular management license based on the second identifier; providing, by the management server IHS and to the client IHS, the particular management license to be associated with the second motherboard; and activating, by the client IHS, the particular management license for the second motherboard.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2A:
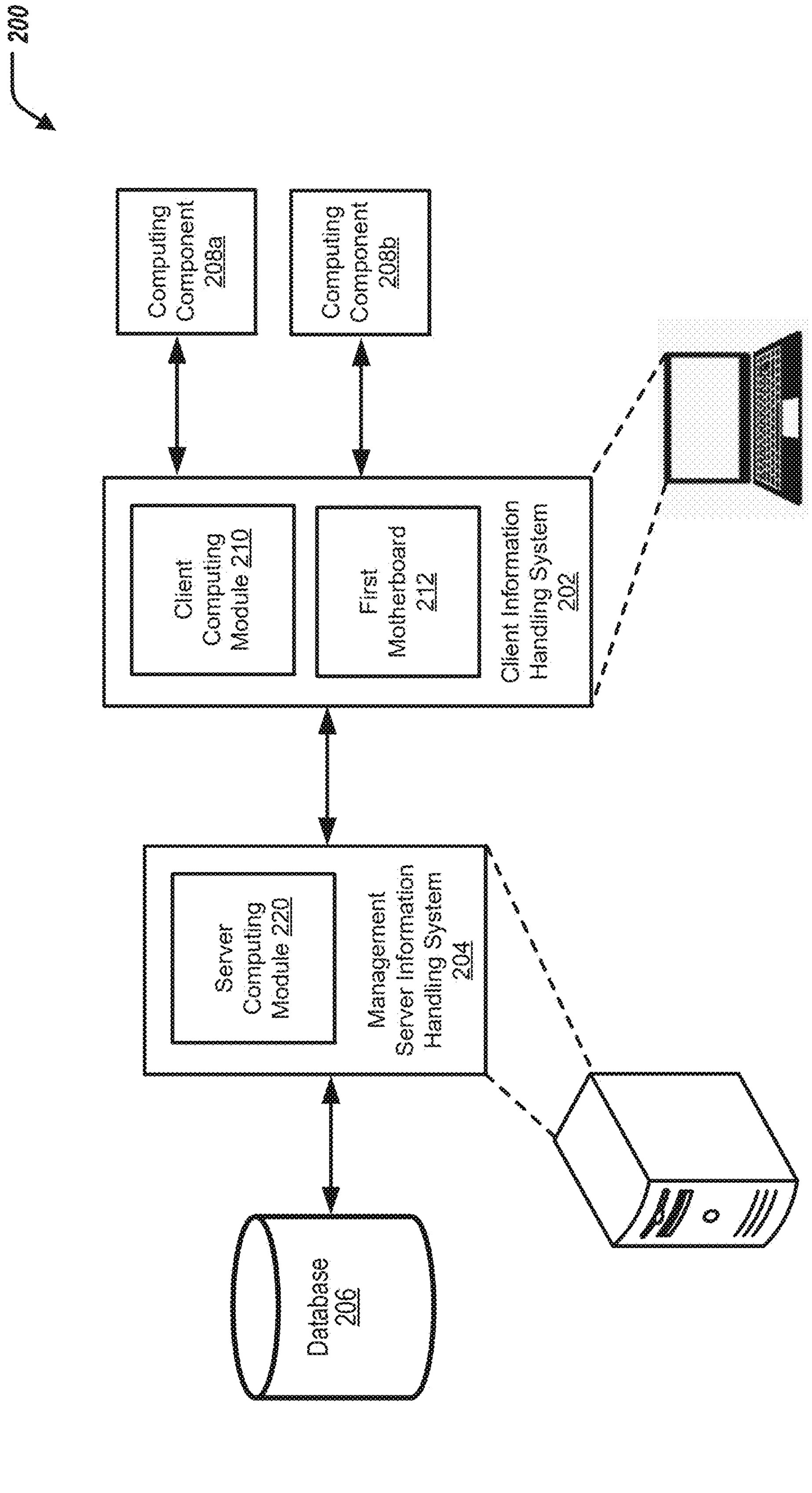
FIGS. 2A, 2B illustrate respective block diagrams of a computing environment for managing motherboard replacement at an information handling system.
Figure 2B:
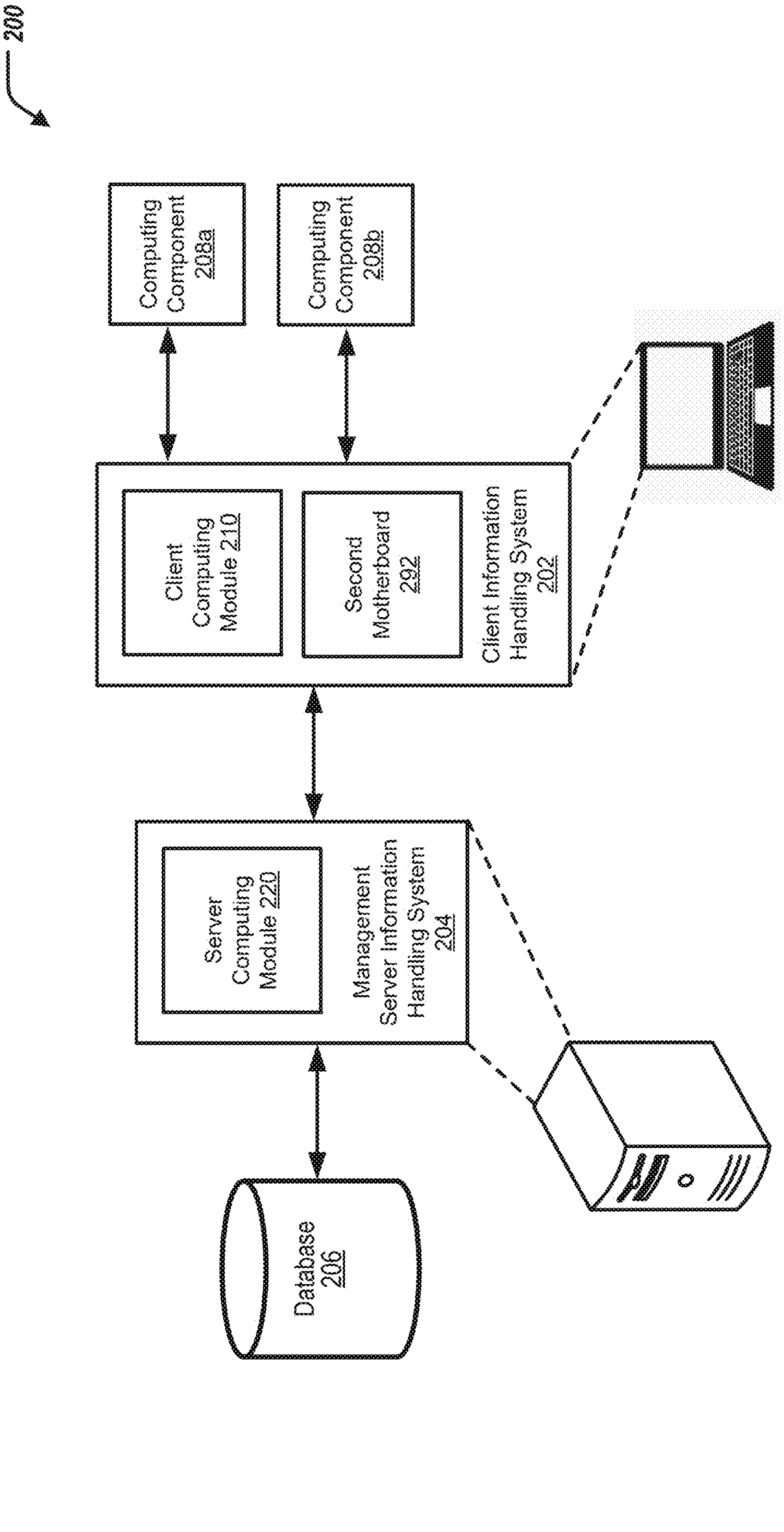

Turning to FIG. 2A, FIG. 2A illustrates an environment 200 including a client information handling system (IHS) 202, a management server information handling system (IHS) 204, a database 206, and computing components 208*a*, 208*b* (collectively referred to as computing components 208).

The client IHS 202 can include a client computing module 210 and a first motherboard 212. In some examples, the client IHS 202 is similar to, or includes, the information handling system 100 of FIG. 1.

The management server IHS 204 can include a management server computing module 220. In some examples, the management server IHS 204 is similar to, or includes, the information handling system 100 of FIG. 1.

The computing components 208 can include any computing component that can be coupled to or in communication with the client IHS 202 (i.e., wired or wirelessly). For example, the computing components 208 can include a display device, a camera, and/or a keyboard input device.

The client IHS 202 can be in communication with the management server IHS 204 (e.g., over a network); and the computing components 208.

The management server IHS 204 can be in communication with the client IHS 202 (e.g., over a network); and the database 206.

The database 206 can be in communication with the management server IHS 204.

In short, the first motherboard 212 can fail (have a fault) and need to be physically replaced. The environment 200 can provide for zero-touch manageability experience for replacement of the first motherboard 212 via the management server IHS 204. Specifically, the management server IHS 204 can utilize a combination of identifiers of the motherboard and/or the computing components 208 to identify management licenses for a replacement motherboard. That is, migration of the management license can be transferred to the new motherboard without the need of an IT administrator and/or field/service engineers. The motherboard can be replaced while skipping OOBE steps for the end-user. In short, the motherboard can be replaced and the management license applied to the new motherboard based on identifiers of the computing components 208.

Figure 3A:
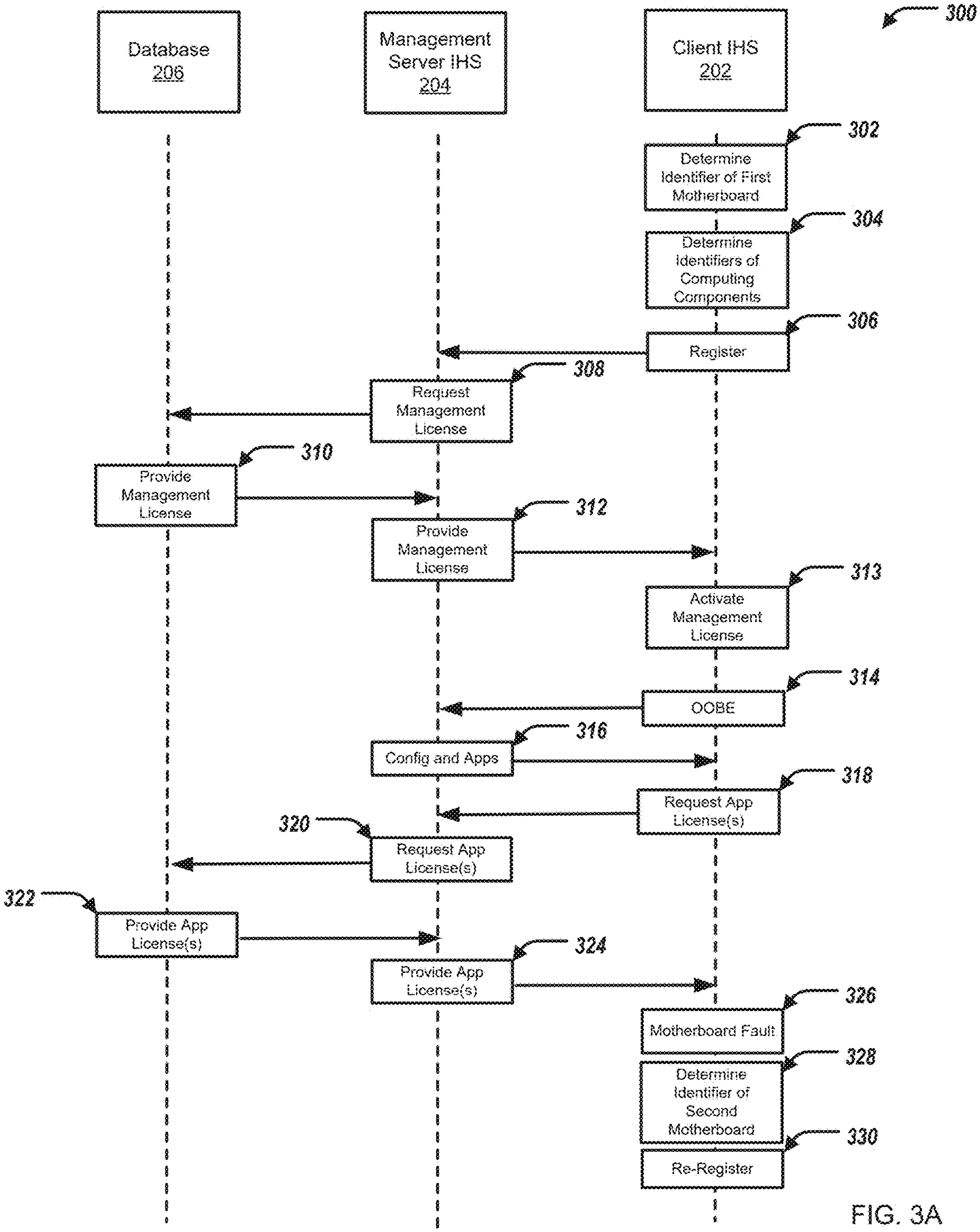
FIGS. 3A, 3B illustrate a swim-lane diagram for managing motherboard replacement at an information handling system.
Figure 3B:
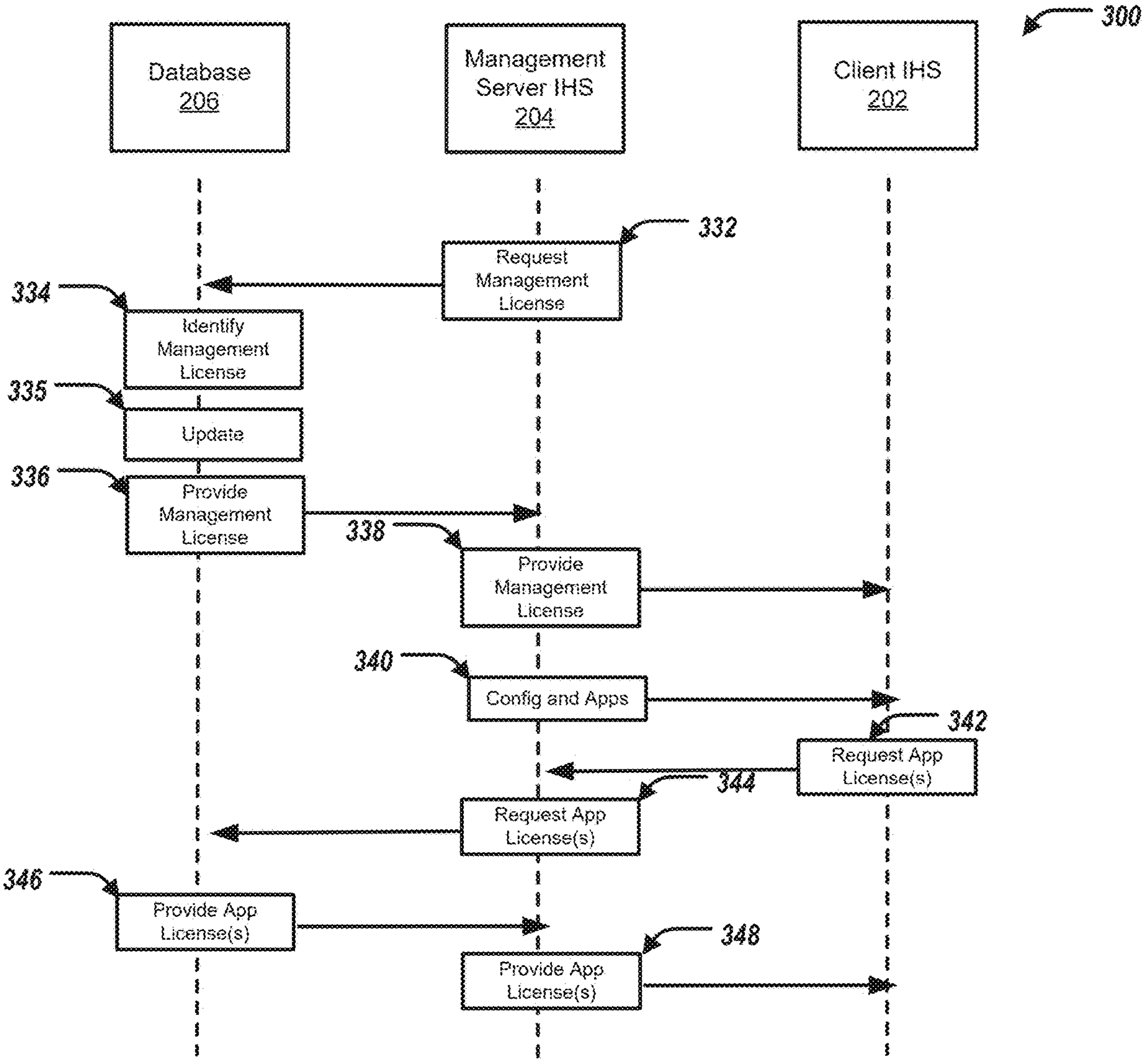

FIGS. 3A, 3B illustrate a swim-lane diagram of a method 300 for managing motherboard replacement at an information handling system. The method 300 may be performed by the information handling system 100, the client information handling system 202, and/or the management server information handling system 204, and with reference to FIGS.

1-2. It is noted that certain operations described in method 300 may be optional or may be rearranged in different embodiments.

The client IHS 202 determines a first identifier of the first motherboard 212, at 302. Specifically, the client computing module 210 determines the first identifier of the first motherboard 212. The first identifier of the first motherboard 212 can include a serial number of the first motherboard 212.

The client IHS 202 determines a second identifier of one or more of the computing components 208, at 304. Specifically, the client computing module 210 determines the second identifier of each of the computing components 208. For example, the computing component 208*a* can include a display device coupled to the client IHS 202, and the second identifier of the display device can include an extended display identification data (EDID). For example, the computing component 208*b* can include a keyboard device coupled to the client IHS 202, and the second identifier of the keyboard device can include a human interface device (HID). For example, the computing components 208 can include a camera.

The client IHS 202 registers with the management server IHS 204, at 306. Specifically, the client computing module 210 registers the client IHS 202 with the management server IHS 204. The client IHS 202 registers with the management server IHS 204 with the first identifier and the second identifier. That is, the client IHS 202 provides the first identifier and the second identifier to the management server IHS 204.

The management server IHS 204 requests a particular management license for the client IHS 202, at 308. Specifically, the server computing module 220 requests the particular management license from the database 206. The server computing module 220 requests the particular management license based on the first identifier (of the first motherboard 212) and the second identifier (of either the computing component 208*a*, 208*b*, or both). The management server IHS 204 receives the particular management license from the database 206, at 310. In summary, the management server IHS 204 obtains the particular management license for the client IHS 202 from the database 206 based on the first identifier and the second identifier(s).

The management server IHS 204 provides the particular management license to the client IHS 202, at 312. Specifically, the server computing module 220 provides the particular management license to the client IHS 202 that is associated with the first motherboard 212.

The client IHS 202 activates, at a first time, the particular management license for the first motherboard 212 (at the first motherboard 212), at 313. Specifically, the client computing module 210 activates, in response to receiving the particular management license, the particular management license for the first motherboard 212.

The client IHS 202 proceeds with an out-of-box-experience (OOBE), at 314. Specifically, the client IHS 202 performs the initial configuration of the first motherboard 212. In some examples, the initial configuration of the first motherboard 212 can include sharing preferences associated with the first motherboard 212 and/or the client IHS 202, and sharing data regarding application licenses of applications associated with the first motherboard 212 and/or the client IHS 202.

The management server IHS 204 can provide (push) any configuration and applicant licenses to the client IHS 202, at 316. The client IHS 202 can request, from the management server IHS 204, application licenses from the client IHS 202, at 318. The management server IHS 204 can request the application licenses from the database 206, at 320. The database 206 can provide the application licenses to the management server IHS 204, at 322. The management server IHS 204 provides the application licenses to the client IHS 202, at 324.

The client IHS 202 detects, at a second time after the first time, a replacement of the first motherboard 212 with a second motherboard 292, as shown in FIG. 3B, at 326. For example, the first motherboard 212 can become faulty, and a user or an information technology decision maker (ITDM) can physically replace the first motherboard 212 with the second motherboard 292. For example, the client computing module 210 can detect that the identifier of the motherboard associated with the client IHS 202 has changed.

The client IHS 202 determines a third identifier of the second motherboard 292, at 328. Specifically, the client computing module 210 of the client IHS 202 determines the third identifier of the second motherboard 292. The third identifier of the second motherboard 292 can include a serial number of the second motherboard 292.

The client IHS 202 re-registers with the management server IHS, at 330. Specifically, the client computing module 210 re-registers the client IHS 202 with the management server IHS. The client IHS 202 re-registers with the management server IHS with the third identifier and the second identifier. That is, the client IHS 202 provides the third identifier (of the second motherboard 292) and the second identifiers (of the computing component(s) 208) to the management server IHS 204.

The management server IHS 204 requests the particular management license for the client IHS 202, at 332. Specifically, the server computing module 220 requests the particular management license from the database 206. The server computing module 220 requests the particular management license based on the second identifier(s) (of either the computing component 208*a*, 208*b*, or both). The management server IHS 204 identifies at the database 206, the particular management license based on the second identifier(s). Specifically, the management server IHS 204 determines that only the first motherboard 212 has been replaced as the second identifiers of the computing components 208 are the same as stored by the database 206.

The management server IHS 204 further updates the database 206 to associate the particular management license with the third identifier (of the second motherboard 292), at 335. That is, the server computing module 220 updates the database 206 to i) associate the particular management license with the third identifier (of the second motherboard 292) and further ii) maintain the association of the particular management license with the second identifier(s) of the computing components 208.

The management server IHS 204 receives the particular management license from the database 206, at 336. In summary, the management server IHS 204 obtains the particular management license for the client IHS 202 from the database 206 based on the second identifier(s).

The management server IHS 204 provides the particular management license to the client IHS 202, at 338. Specifically, the server computing module 220 provides the particular management license to the client IHS 202 that is associated with the second motherboard 292.

The management server IHS 204 can provide (push) any configuration and applications to the client IHS 202, at 340. The client IHS 202 can request, from the management server IHS 204, application licenses from the client IHS 202, at 342. The management server IHS 204 can request the application licenses from the database 206, at 344. The database 206 can provide the application licenses to the management server IHS 204, at 346. The management server IHS 204 provides the application licenses to the client IHS 202, at 348.

The client IHS 202 can activate the particular management license from the second motherboard 292. Further, the client IHS 202 can activate the application licenses for the applications. That is, the client computing module 210 can activate the particular management license for the second motherboard 292 such that the second motherboard 292 is available for utilization at the client IHS 202, and activates the application licenses for the applications such that the applications are available for utilization at the client IHS 202.

In some examples, the client IHS 202 applies the user preferences at the client IHS 202 and/or the second motherboard 292 without proceeding with an out-of-box-experience (OOBE). Specifically, the client IHS 202 performs the configuration of the second motherboard 292 without an OOBE. In some examples, the configuration of the second motherboard 292 can include sharing preferences associated with the second motherboard 292 and/or the client IHS 202, and sharing data regarding application licenses of applications associated with the second motherboard 292 and/or the client IHS 202.

Figure 4:
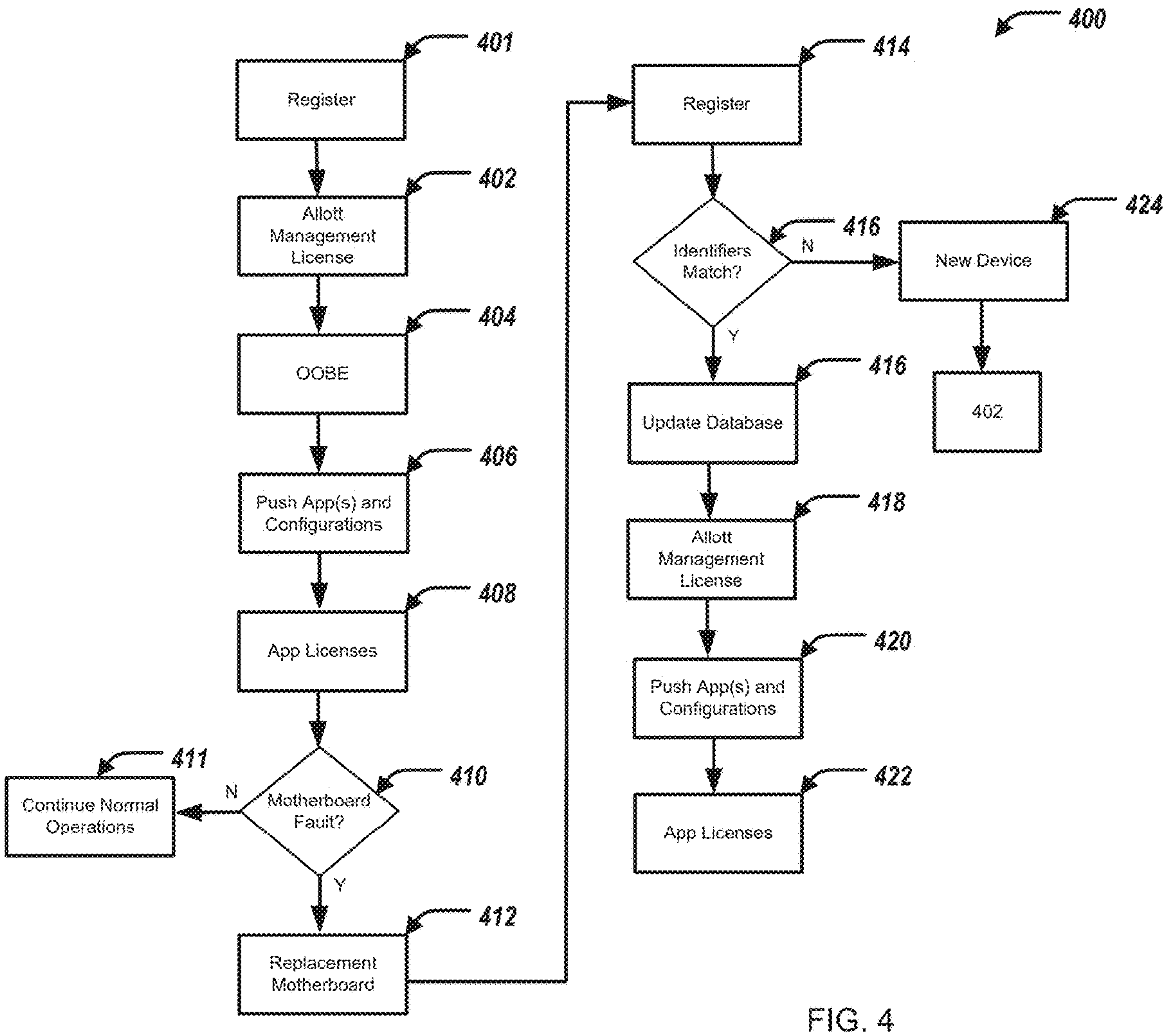
FIGS. 4, 5 illustrate respective methods for managing motherboard replacement at an information handling system.

FIG. 4 illustrates a method for managing motherboard replacement at an information handling system. The method 400 may be performed by the information handling system 100, the client information handling system 202, and/or the management server information handling system 204, and with reference to FIGS. 1-2. It is noted that certain operations described in method 400 may be optional or may be rearranged in different embodiments.

A client IHS registers with the management server IHS, at 401. The management server IHS 204 allots a particular management license for the motherboard of the client IHS, at 402. The client IHS proceeds with an out-of-box-experience (OOBE), at 404. The management server IHS 204 can provide (push) any configuration and applications to the client IHS, at 406. The client IHS can request, from the management server IHS 204, application licenses from the client IHS and consume such, at 408. The client IHS determines whether there is a fault at the motherboard of the client IHS, at 410. When the client IHS determines that there is not a fault at the motherboard thereof, the client IHS continues with standard/normal operations, at 411. When the client IHS determines that there is a fault at the motherboard, the motherboard is replaced with a new motherboard, at 412. The client IHS re-registers with the management server IHS 204, at 414. The management server IHS 204 determines whether the second identifier(s) provided during re-registering of the client IHS matches with previously stored identifiers at the database 206, at 416. When the management server IHS 204 determines that the second identifier(s) provided during re-registering of the client IHS match with previously stored identifiers at the database 206, the management server IHS 204 updates the database 206 to associate the particular management license with the identifier of the new motherboard, at 416. The management server IHS 204 allots the particular management license for the new motherboard of the client IHS, at 418. The management server IHS 204 can provide (push) any configuration and applications to the client IHS, at 420. The client IHS can request, from the management server IHS 204, application licenses from the client IHS and consume such, at 422. When the management server IHS 204 determines that the second identifier(s) provided during re-registering of the client IHS do not match with previously stored identifiers at the database 206, the management server IHS 204 determines that the client IHS is a new IHS, at 424, and proceeds back to step 402.

Figure 5:
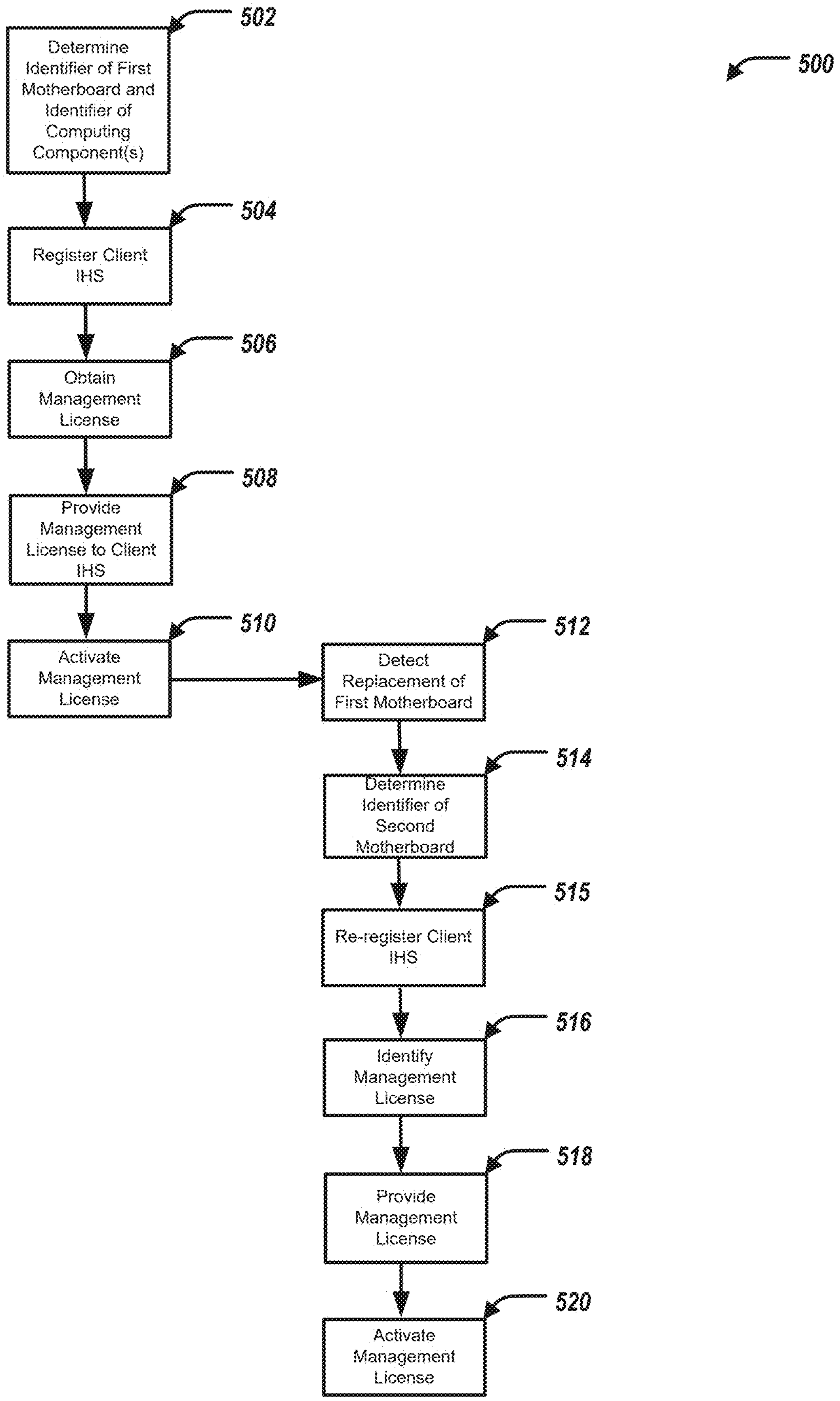

FIG. 5 illustrates a method for managing motherboard replacement at an information handling system. The method 500 may be performed by the information handling system 100, the client information handling system 202, and/or the management server information handling system 204, and with reference to FIGS. 1-2. It is noted that certain operations described in method 500 may be optional or may be rearranged in different embodiments.

The client IHS 202 determines a first identifier of the first motherboard 212 and a second identifier of one or more of the computing components 208, at 502. The client IHS 202 registers with the management server IHS 204, at 504. The management server IHS 204 obtains the particular management license for the client IHS 202 from the database 206 based on the first identifier and the second identifier(s), at 506. The management server IHS 204 provides the particular management license to the client IHS 202, at 508. The client IHS 202 activates, at a first time, the particular management license for the first motherboard 212 (at the first motherboard 212), at 510. The client IHS 202 detects a replacement of the first motherboard 212 with a second motherboard 292, at 512. The client IHS 202 determines a third identifier of the second motherboard 292, at 514. The client IHS 202 re-registers with the management server IHS 204, at 515. The management server IHS 204 identifies the particular management license for the client IHS 202, at 516. The management server IHS 204 provides the particular management license to the client IHS 202, at 518. The client IHS 202 can activate the particular management license from the second motherboard 292, at 520.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of managing motherboard replacement at a client information handling system (IHS), including:

determining, by the client IHS, a first identifier of a first motherboard of the client IHS and a second identifier of another computing component of the client IHS;

registering the client IHS to a management server information handling system (IHS) with the first identifier and the second identifier;

obtaining, by the management server IHS and based on the first identifier and the second identifier, a particular management license for the client IHS;

providing, by the management server IHS and to the client IHS, the particular management license to be associated with the first motherboard;

activating, by the client IHS and at a first time, the particular management license for the first motherboard;

detecting, at a second time after the first time, replacement of the first motherboard with a second motherboard at the client IHS, and in response:

determining, by the client IHS, a third identifier of the second motherboard of the client IHS;

re-registering the client IHS to the management server IHS with the third identifier and the second identifier;

identifying, by the management server IHS, the particular management license based on the second identifier;

providing, by the management server IHS and to the client IHS, the particular management license to be associated with the second motherboard; activating, by the client IHS, the particular management license for the second motherboard;

updating, by the management server IHS, a database to associate the particular management license with the third identifier of the second motherboard; and maintaining the association of the particular management license with the second identifier of the another computing component.

2. The computer-implemented method of claim 1, wherein the another computing component includes a display device coupled to the information handling system.

3. The computer-implemented method of claim 1, wherein the another computing component includes a keyboard device coupled to the information handling system.

4. The computer-implemented method of claim 1, wherein obtaining the particular license management license for the client IHS further includes:

requesting, by the management server IHS and to the database, the particular license management license based on the first identifier and the second identifier; and receiving, by the management server IHS and from the database, the particular license management license.

5. The computer-implemented method of claim 1, further including:

requesting, by the client IHS and to the management server IHS, application licenses for the client IHS;

identifying, by the management server IHS, the application licenses based on the third identifier and the second identifier;

providing, by the management server IHS and to the client IHS, the application licenses; and activating, by the client IHS, the application licenses.

6. A computing environment, including:

a management server information handling system (IHS) comprising a processor having access to memory media storing instructions executable by the processor to perform operations;

a client information handling system (IHS) comprising a processor having access to memory media storing instructions executable by the processor to perform operations;

determining, by the client IHS, a first identifier of a first motherboard of the client IHS and a second identifier of another computing component of the client IHS;

registering the client IHS to the management server IHS with the first identifier and the second identifier;

wherein the management server IHS is configured to perform operations:

obtaining, by the management server IHS and based on the first identifier and the second identifier, a particular management license for the client IHS;

providing, by the management server IHS and to the client IHS, the particular management license to be associated with the first motherboard;

wherein the client IHS is configured to perform operations:

activating, by the client IHS and at a first time, the particular management license for the first motherboard;

detecting, at a second time, replacement of the first motherboard with a second motherboard at the client IHS, and in response:

determining, by the client IHS, a third identifier of the second motherboard of the client IHS;

re-registering the client IHS to the management server IHS with the third identifier and the second identifier;

wherein the management server IHS is configured to perform operations:

identifying, by the management server IHS, the particular management license based on the second identifier;

providing, by the management server IHS and to the client IHS, the particular management license to be associated with the second motherboard;

wherein the client IHS is configured to perform operations:

activating, by the client IHS, the particular management license for the second motherboard;

wherein the management server IHS is configured to perform operations:

updating a database to associate the particular management license with the third identifier of the second motherboard; and maintaining the association of the particular management license with the second identifier of the another computing component.

7. The computing environment of claim 6, wherein the another computing component includes a display device coupled to the information handling system.

8. The computing environment of claim 6, wherein the another computing component includes a keyboard device coupled to the information handling system.

9. The computing environment of claim 6, wherein obtaining the particular license management license for the client IHS further includes:

requesting, by the management server IHS and to the database, the particular license management license based on the first identifier and the second identifier; and receiving, by the management server IHS and from the database, the particular license management license.

10. The computing environment of claim 6, wherein the client IHS is configured to perform operations:

requesting, to the management server IHS, application licenses for the client IHS;

wherein the management server IHS is configured to perform operations:

identifying the application licenses based on the third identifier and the second identifier;

providing, to the client IHS, the application licenses; and wherein the client IHS is configured to perform operations:

activating, by the client IHS, the application licenses.

11. A non-transitory computer-readable medium storing software comprising instructions executable by one or more computers which, upon such execution, cause the one or more computers to perform operations comprising:

determining, by a client information handling system (IHS), a first identifier of a first motherboard of the client IHS and a second identifier of another computing component of the client IHS;

registering the client IHS to a management server information handling system (IHS) with the first identifier and the second identifier;

obtaining, by the management server IHS and based on the first identifier and the second identifier, a particular management license for the client IHS;

providing, by the management server IHS and to the client IHS, the particular management license to be associated with the first motherboard;

activating, by the client IHS and at a first time, the particular management license for the first motherboard;

detecting, at a second time after the first time, replacement of the first motherboard with a second motherboard at the client IHS, and in response:

determining, by the client IHS, a third identifier of the second motherboard of the client IHS;

re-registering the client IHS to the management server IHS with the third identifier and the second identifier;

identifying, by the management server IHS, the particular management license based on the second identifier;

providing, by the management server IHS and to the client IHS, the particular management license to be associated with the second motherboard;

activating, by the client IHS, the particular management license for the second motherboard;

updating, by the management server IHS, a database to associate the particular management license with the third identifier of the second motherboard; and maintaining the association of the particular management license with the second identifier of the another computing component.

12. The non-transitory computer-readable medium of claim 11, wherein the another computing component includes a display device coupled to the information handling system.

13. The non-transitory computer-readable medium of claim 11, wherein the another computing component includes a keyboard device coupled to the information handling system.

14. The non-transitory computer-readable medium of claim 11, wherein obtaining the particular license management license for the client IHS further includes:

requesting, by the management server IHS and to the database, the particular license management license based on the first identifier and the second identifier; and receiving, by the management server IHS and from the database, the particular license management license.

15. The non-transitory computer-readable medium of claim 11, the operations further including:

requesting, by the client IHS and to the management server IHS, application licenses for the client IHS;

identifying, by the management server IHS, the application licenses based on the third identifier and the second identifier;

providing, by the management server IHS and to the client IHS, the application licenses; and activating, by the client IHS, the application licenses.

* * * * *